US012809892B2

(12) United States Patent
Twohig et al.

(10) Patent No.: US 12,809,892 B2
(45) Date of Patent: Nov. 24, 2026

(54) INTERACTIVE VOICE RESPONSE INTERFACE TO A STORAGE SYSTEM MANAGEMENT APPLICATION

(71) Applicant: Dell Products, L.P., Hopkinton, MA (US)

(72) Inventors: Aaron Twohig, Rathpeacon (IE); Paul McSweeney, Silversprings (IE); Brian O'Halloran, Carrigaline (IE)

(73) Assignee: Dell Products, L.P., Hopkinton, MA (US)

( * ) Notice: Subject to any disclaimer, the term of this patent is extended or adjusted under 35 U.S.C. 154(b) by 261 days.

(21) Appl. No.: 18/642,909

(22) Filed: Apr. 23, 2024

(65) Prior Publication Data

US 2025/0328556 A1 Oct. 23, 2025

(51) Int. Cl.
*G06F 16/3329* (2025.01)
*G06F 3/16* (2006.01)

(52) U.S. Cl.
CPC .......... *G06F 16/3329* (2019.01); *G06F 3/167* (2013.01)

(58) Field of Classification Search
None
See application file for complete search history.

(56) References Cited

U.S. PATENT DOCUMENTS

| | | | | |
|---|---|---|---|---|
| 2018/0232443 | A1* | 8/2018 | Delgo | G06F 16/322 |
| 2019/0018839 | A1* | 1/2019 | Ge | G06F 16/3329 |
| 2021/0286950 | A1* | 9/2021 | Quamar | G06F 40/295 |
| 2021/0365488 | A1* | 11/2021 | Chen | G06F 16/3329 |
| 2022/0092028 | A1* | 3/2022 | Layton | G06F 16/122 |
| 2022/0198211 | A1* | 6/2022 | Ferreira Moreno | G06F 16/447 |
| 2023/0081891 | A1* | 3/2023 | Kulkarni | G06N 5/02 706/50 |
| 2024/0037128 | A1* | 2/2024 | Koneru | G06F 16/322 |
| 2024/0086646 | A1* | 3/2024 | Hasan | G06F 40/30 |
| 2025/0007870 | A1* | 1/2025 | Kim | G06F 16/2455 |
| 2025/0053736 | A1* | 2/2025 | Zhao | G06F 16/367 |
| 2025/0094675 | A1* | 3/2025 | Chiu | G06F 30/13 |
| 2025/0139142 | A1* | 5/2025 | Kasturi | G06F 16/3329 |
| 2025/0148020 | A1* | 5/2025 | Padmashali | G06F 16/93 |
| 2025/0156413 | A1* | 5/2025 | Barkan | G06F 16/243 |
| 2025/0217351 | A1* | 7/2025 | Tan | G06F 16/2423 |
| 2025/0217769 | A1* | 7/2025 | Kumar | G06F 16/332 |

(Continued)

*Primary Examiner* — Jonathan C Kim
(74) *Attorney, Agent, or Firm* — Anderson Gorecki LLP

(57) ABSTRACT

A textual description of a machine-readable model describing a configuration of the storage system is created. The textual description includes a plurality of textual statements, in which each individual textual statement describes a relationship between a pair of objects of the machine-readable model, or describes a relationship between a given object and a respective value of the given object. The textual statements describing the configuration of the storage system are provided as training input to a large language model to train the large language model to learn the textual description of the storage system configuration. The large language model is then used, by an interactive voice response system to respond to natural language queries about the storage system configuration. The machine-readable model may be implemented using a Java model that is annotated to identify relationships between objects that should be used to generate textual statements describing the storage system configuration.

14 Claims, 5 Drawing Sheets

(56) References Cited

U.S. PATENT DOCUMENTS

| | | | | |
|---|---|---|---|---|
| 2025/0238447 | A1* | 7/2025 | Arkoff | G06F 21/6245 |
| 2025/0259255 | A1* | 8/2025 | Penrose | G06F 16/7844 |
| 2025/0272498 | A1* | 8/2025 | Haffari | G06F 16/36 |
| 2025/0278421 | A1* | 9/2025 | Zhao | G06F 16/9024 |
| 2025/0291854 | A1* | 9/2025 | Ho | G06F 16/93 |
| 2025/0328556 | A1* | 10/2025 | Twohig | G06F 16/3329 |

* cited by examiner

INTERACTIVE VOICE RESPONSE INTERFACE TO A STORAGE SYSTEM MANAGEMENT APPLICATION

FIELD

This disclosure relates to computing systems and related devices and methods, and, more particularly, to a method and apparatus for training a large language model to learn a textual description of a storage system configuration, to enable implementation of an interactive voice response interface to a storage system management application.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A storage system management application enables access to configuration information of a storage system and enables changes to be made to the storage system configuration. As storage systems increase in complexity, the storage system management applications likewise have increased in complexity, and a user may require extensive training to enable the user to become familiar with many/all of the available features of the storage system management application. For example, often the features of the storage system management application are available in a graphical user interface or command line interface, which may require considerable skill to navigate to determine the current configuration settings of the storage system, and to make the appropriate changes to cause the storage system to implement desired functionality.

According to some embodiments, a method and apparatus for training a large language model to learn a storage system configuration is provided, which enables an interactive voice response system to be used to access a storage system management application. In some embodiments, the natural language interface to the storage system management application enables a user to simply ask questions related to storage system configuration, and have the storage system management application respond with the requested configuration information. Likewise, in some embodiments, the natural language interface enables the user to provide voice prompts to cause the storage system management application to make configuration changes to the storage system or to cause the storage system management application to directly move to the correct portion of the graphical user interface that is configured to enable the verbally identified aspect of the storage system configuration to be viewed and adjusted.

According to some embodiments, a system for training a large language model to learn storage system configuration to enable interactive voice response access to a storage system management application is provided. In some embodiments, a text generation system is configured to integrate with the storage system management application to create text based on a machine-readable model built by the storage system management application based on the storage system configuration. After the machine-readable model has been created or updated by the storage system management application, the training system incrementally creates a textual representation of the model, using Java introspection and annotations that are added to the Java model to identify relationships between objects of the Java model. After the text-based representation of the storage system configuration has been generated, the text describing the storage system configuration is provided to the large language model to enable the large language model to learn the storage system configuration. The large language model is then used by the Interactive Voice Response (IVR) interface to the storage system management application to provide a natural language interface to the storage system management application.

In some embodiments, a method of providing an interactive voice response interface to a storage system management application includes creating a textual representation of a machine-readable model describing a configuration of a storage system managed by the storage system management application, the textual representation including a plurality of textual statements in which each textual statement describes a relationship between a pair of objects of the machine-readable model or describes a relationship between a given object and a respective value of the given object. The method also includes providing the textual representation of the configuration of the storage system to a large language model as training data for the large language model to train the large language model to learn the textual description of the configuration of the storage system, and using the large language model by an interactive voice response system of the storage system management application to respond to natural language queries about the configuration of the storage system.

In some embodiments, the machine-readable model is a hierarchical Java model containing the objects describing the configuration of the storage system, the hierarchical Java model describing relationships between the objects. In some embodiments, creating the textual representation of the machine-readable model includes traversing the hierarchical Java model to identify each object of the Java model, and for each identified object, determining a type name of the identified object, determining a relationship between the identified object and another object, and generating one of the textual statements describing the determined relationship between the identified object and the another object. In some embodiments, determining the relationship between the identified object and the another object is implemented by annotating the another object using a Java annotation in the hierarchical Java model, the Java annotation specifying that the one of the textual statements should be created describing the determined relationship between the identified object and the another object.

In some embodiments, determining the relationship between the identified object and the another object is implemented by examining get* methods of the identified object that are annotated using the Java annotation. In some embodiments, a * portion of the get* method includes an object name written in CamelText, the method further includes generating a human readable name of the another object by removing the word "get" from the get* method and converting the object name written in CamelText to human readable text. In some embodiments, a * portion of the get* method includes an object name written as an acronym, the method further includes performing a lookup in an acronym dictionary to generate a human readable name of the another object.

In some embodiments, creating the textual representation of the machine-readable model includes traversing the hierarchical Java model to identify each object of the Java model, and for each identified object determining a type name of the identified object, using Java introspection to generate a value of the identified object, and generating one of the textual statements describing the determined relationship between the identified object and the object value.

In some embodiments, creating the textual representation of a machine-readable model includes traversing the hierarchical Java model to identify each object of the Java model, and for each identified object determining a type name of the identified object, examining isX( ) and isY( ) methods of the identified object that return boolean or Boolean, and generating one of the textual statements describing the determined relationship between the identified object and the result of the isX( ) and isY( ) methods.

In some embodiments, the method further includes using interactive voice response system to receive natural language instructions regarding storage system configuration changes, and using the large language model to parse the instructions regarding the storage system configuration changes.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable storage medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable storage medium and implemented by multi-purpose tangible processors, and any combinations thereof.

Figure 1:
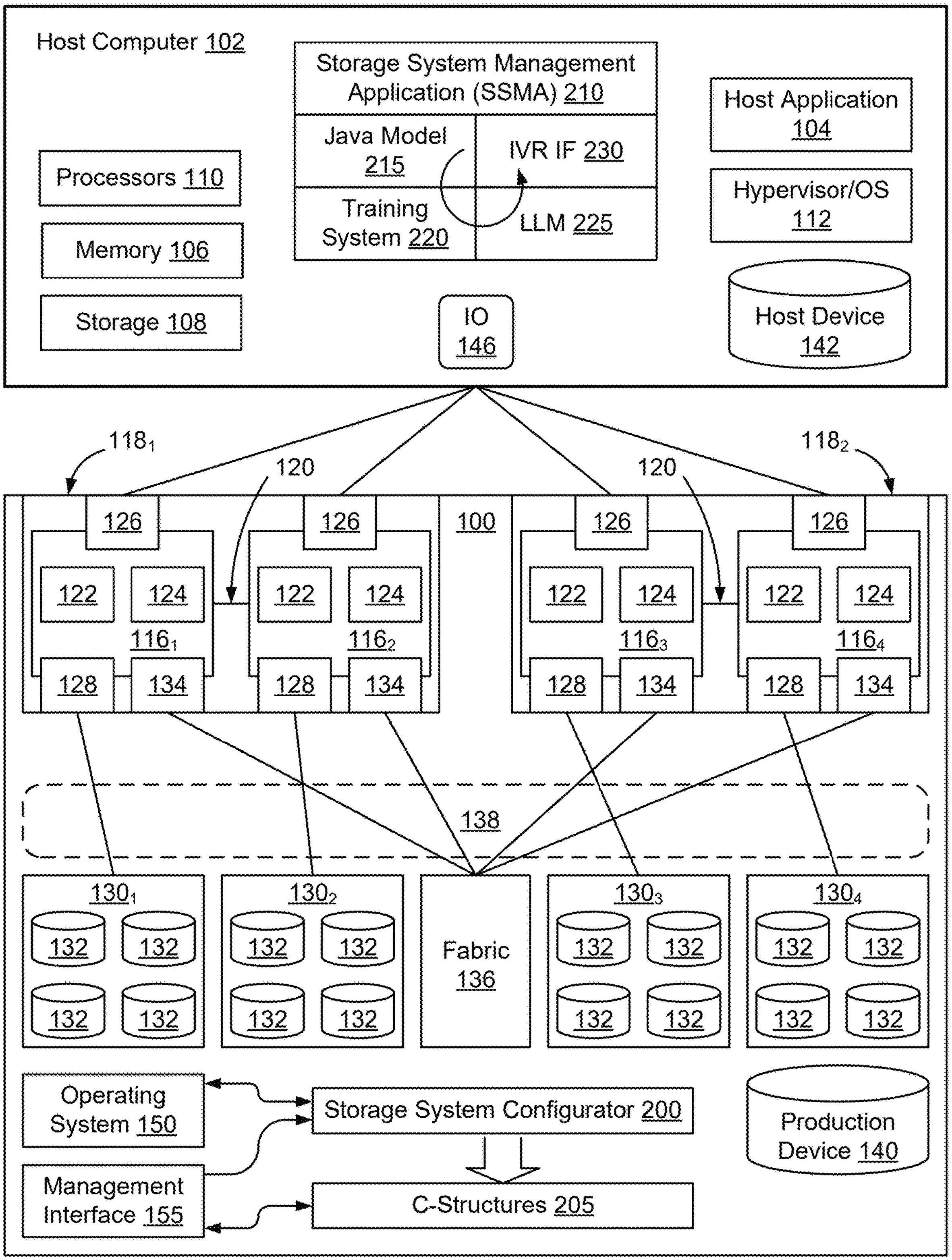
FIG. 1 is a functional block diagram of a host computer connected to an example storage system, including a storage system management application executing on the host computer and a storage system configurator executing on the storage system, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers.

The storage system 100 includes a plurality of compute nodes $\mathbf{116}_1$-$\mathbf{116}_4$, possibly including but not limited to storage servers and specially designed compute engines or storage directors for providing data storage services. In some embodiments, pairs of the compute nodes, e.g. ($\mathbf{116}_1$-$\mathbf{116}_2$) and ($\mathbf{116}_3$-$\mathbf{116}_4$), are organized as storage engines $\mathbf{118}_1$ and $\mathbf{118}_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $\mathbf{118}_1$ and $\mathbf{118}_2$, which has a pair of (two independent) compute nodes, e.g. ($\mathbf{116}_1$-$\mathbf{116}_2$) or ($\mathbf{116}_3$-$\mathbf{116}_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or over an interconnecting fabric 136. An example interconnecting fabric 136 may be implemented using PCIe or IB. Each compute node 116 may allocate a portion or partition of its respective local volatile memory 124 to a virtual shared memory 138 that can be accessed by any compute node 116 of storage system 100.

The storage system 100 maintains data for host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106 or storage 108. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$.

In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

As shown in FIG. 1, storage systems are one example of a complex electrical computing system that may be configured in multiple way to achieve multiple different types of functions. For example, the storage system 100 may be used by multiple host computers, and different configuration changes may be implemented on the storage system such as to zone aspects of the storage system for use by each of the computers, create the storage volumes, storage groups, and many other aspects of how the storage system should provide access to storage resources and protect data stored in managed drives.

According to some embodiments, as shown in FIG. 1, multiple systems may cooperate to enable the configuration of the storage system to be set and adjusted over time. For example, as shown in FIG. 1, in some embodiments a storage system configurator 200 may be implemented on the storage system 100, that receives configuration instructions and interacts with the operating system 150 of the storage system to change the configuration of the storage system. Example configuration actions might be, for example, to cause creation of storage volumes, link the storage volumes to particular devices, create storage groups of storage volumes, create storage pools of back-end storage resources to be used to implement the actual storage for the various storage volumes, and multiple other configuration related operations. In some embodiments, the storage system configurator 200 includes a management interface 155, e.g., implemented as a command line interface or graphical user interface, that enables access to the storage system configurator 200 to enable a user to take configuration actions and make configuration queries directly on the storage system 100. In some embodiments, information describing configuration actions implemented on the storage system are maintained by the storage system configurator 200 as machine-readable structures referred to herein as C-structures 205.

In some embodiments, storage system management actions may also be implemented on the storage system from an external storage system management application 210 which may be run on host 102 or on another computer external to the storage system 100. The storage system management application 210 may be implemented, for example, as an application running on a laptop computer or as a web application that is accessible through a web portal or in another manner depending on the particular implementation.

According to some embodiments, the storage system management application 210 generates a Java model 215 from the C-structures 205 that are created by the storage system configurator 200 in connection with management operations implemented on the storage system. To provide an interactive voice response system 230 to the storage system management application 210, a training system 220 reads the Java model 215 of the storage system management application 210, and generates training text describing all aspects of the configuration of the storage system. The training text is provided to a large language model 225 as training data, to cause the large language model 225 to learn a natural language description of the configuration of the storage system. The large language model 225 is then used by the interactive voice response interface 230 to enable natural language queries to be asked of the storage system management application 210, and to provide natural language responses to the natural language queriers that are based on the learned storage system configuration. The interactive voice response system 230 can also be used, in some embodiments, to instruct the storage system management application 210 to make storage system configuration changes and/or to instruct the storage system management application 210 to transition to a particular aspect of a storage system management application graphical user interface 235. In this manner it is possible for the storage system management application 210 to provide a natural language interface that enables verbal interaction between a user and the storage system management application 210.

Figure 2:
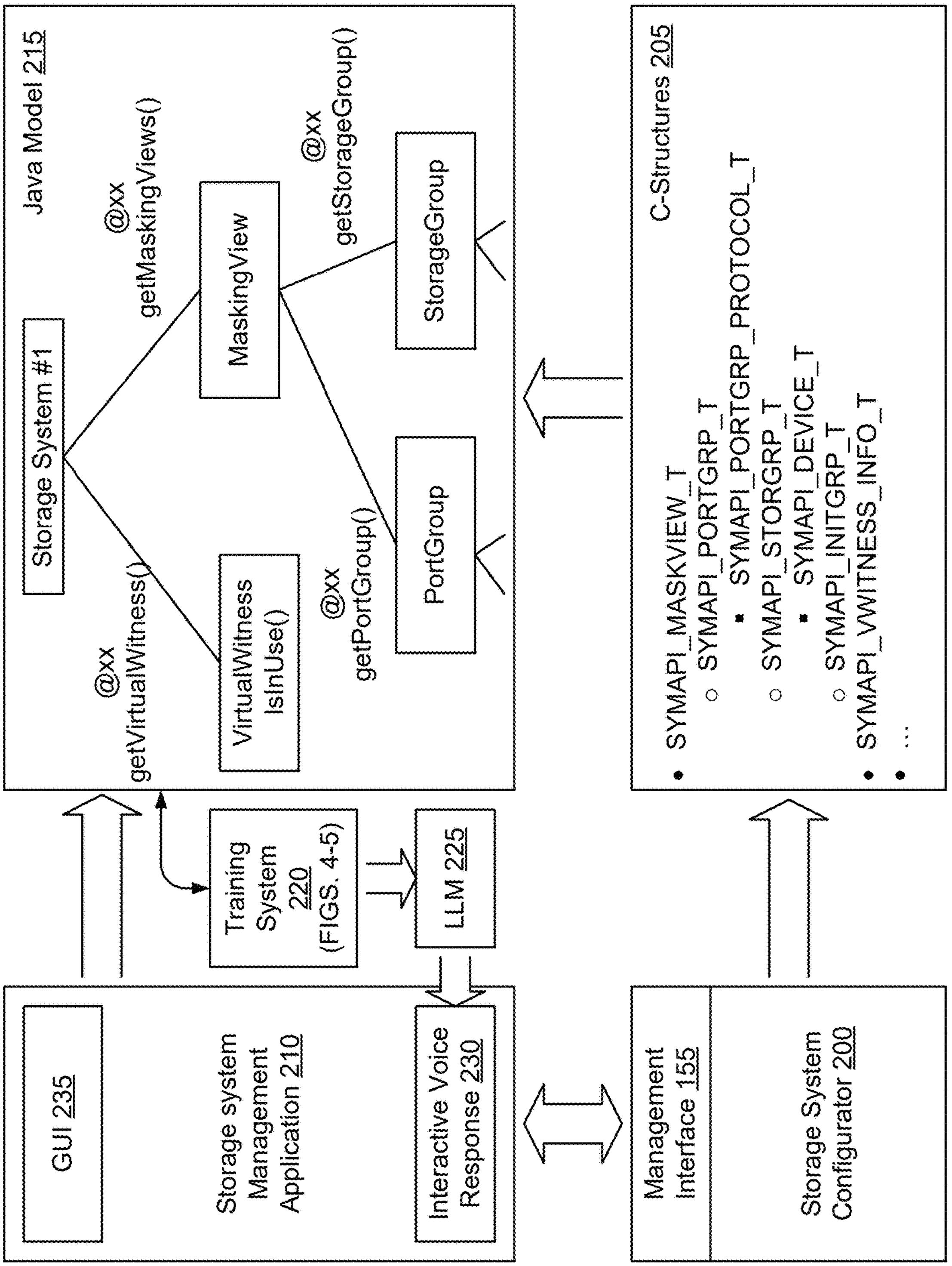
FIG. 2 is a block diagram showing example computer readable models created by the storage system management application and storage system configurator describing the storage system configuration in greater detail, according to some embodiments.

FIG. 2 is a block diagram showing example computer readable models created by the storage system management application 210 and C-structures used by the storage system configurator 200 to describe the storage system configuration, according to some embodiments. As shown in FIG. 2, in some embodiments the storage system configurator 200 maintains machine-readable hierarchical models referred to herein as C-structures 205 that are specifically configured to support Graphical User Interfaces and Command Line Interfaces implemented by the management interface 155 on the storage system 100. These hierarchical models 205 allow users to explore the very large configuration data in a piecemeal manner. Small parts of the model 205 are retrieved by management interface 155 as needed, and presented in human readable formats such as tables, grides, lists, graphs, etc. As shown in FIG. 2, in some embodiments the C-structures 205 are not designed to be human readable, but rather are assigned names by programmers and thus have relevance primarily to engineers tasked with developing and maintaining the source code of the storage system configurator 200. For example, the C-structures 205 shown in FIG. 2 include nomenclature, such as SYMAPI_MASKVIEW_T, which is not particularly human readable to someone that is not familiar with the inner workings of the storage system configurator 200, and hence not particularly suitable for use in training a Large Language Model (LLM) 225.

The Storage System Management Application 210, by contrast, maintains Java models 215 that are closer to human readable format. For example, in some embodiments the Java model 215 created by the storage system management application 210 uses class names that are human friendly, and more easily understandable than the C-structures. For example, in some embodiments the class names of the Java model 215 are written using camel text, in which words describing the purpose of the object are separated by capital letters. For example, in FIG. 2 the Java class used to reference a storage group is called StorageGroup. By removing the camel text, it is easy to convert "StorageGroup" to "storage group". As used herein, the term "camel text" is used to refer to creating a single word from multiple separate words and differentiating the multiple words within the single word using initial capital letters. Some examples of camel text shown in FIG. 2, include "port group=PortGroup", "storage group=StorageGroup", "masking view=MaskingView", "virtual witness is in use=VirtualWitnessIsInUse", etc.

According to some embodiments, the Java model 215 is annotated to mark the methods that should be used to train the large language model 225. In some embodiments, the annotations are a type of comment or meta data that is inserted into the Java code defining the Java model 215. The annotations can then be processed at compile time by pre-compiler tools, or at runtime using Java Reflection/Java Introspection. The annotations are used to identify and navigate significant relationships between related objects. Although some embodiments are described in which the model 215 is written using Java, other embodiments may use models 215 created using different programming languages. In Java, the "@" sign is used to denote an annotation. As shown in FIG. 2, in some embodiments @xx annotation (where "xx" denotes whatever name the programmer selects for the intended purpose of identifying relationships that should be used to generate training text) is used to identify significant relationships between objects. For example, "xx" could be replaced with "ARelationship", e.g. the annotation "@ARelationship" could be used to identify relationships within the Java model 215 that should be used to generate training text describing the storage system configuration. By making the annotation specific to the training system 220, the training system 220 is able to use Java reflection at runtime to read aspects of the Java model 215 that are determined to be important to the configuration of the storage system, such that the training system 220 is configured to use these relationships to generate instances of text describing each such relationship to be provided to the Large Language Model 225.

When a relationship is detected, a key object of the related object is able to be determined using a getName( ) method, which returns a human readable string of the related object. Using the annotations it is possible to determine relationships between objects. Using Java introspection, it is possible to examine the type or properties of the objects, at runtime, to examine the objects that are determined to be in significant relationships.

Figure 3:
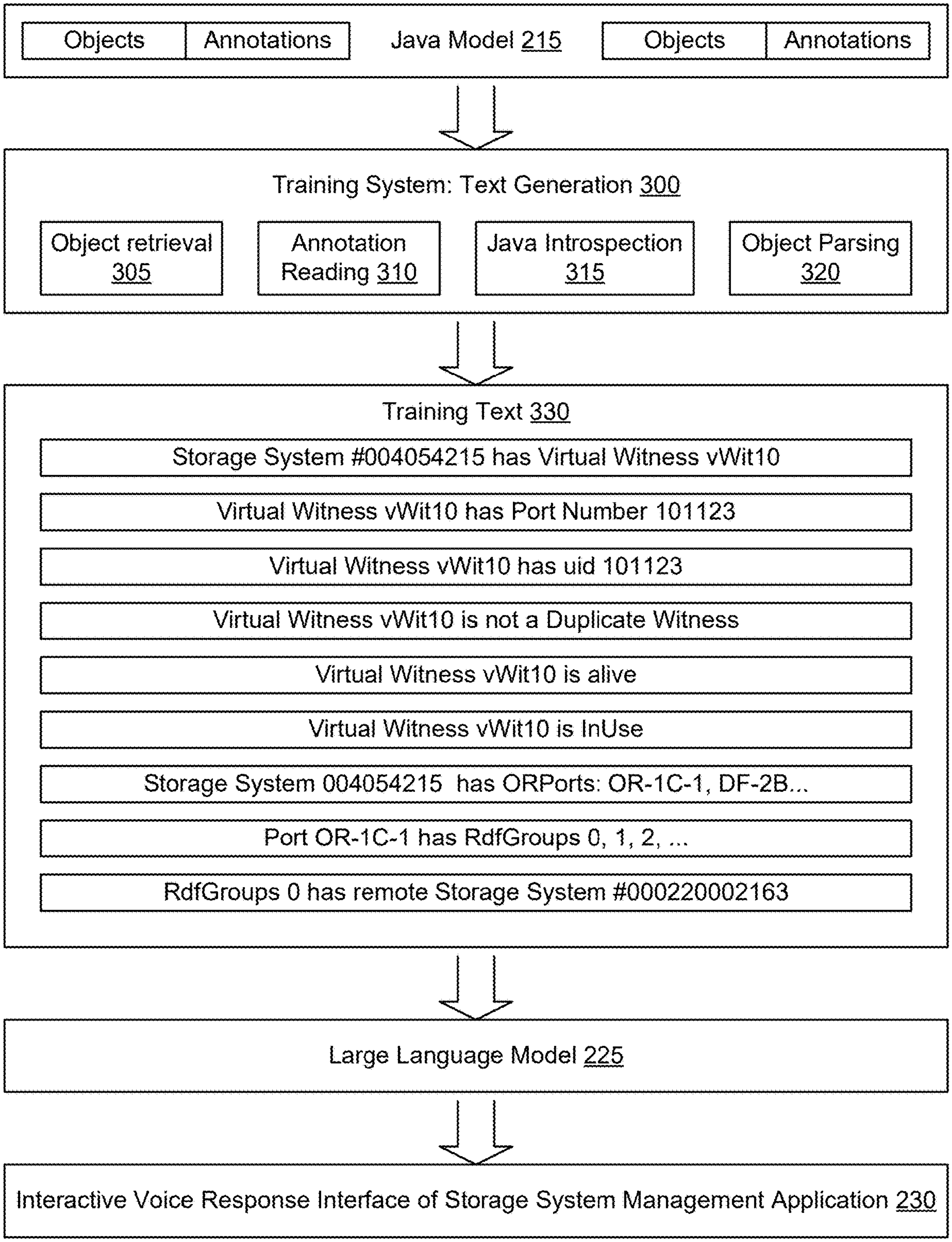
FIG. 3 is a block diagram showing an example process of generating training text from the storage system configuration models of FIG. 2, and using the training text to train a large language model for use by an interactive voice response system to provide a natural language interface to the storage system management application, according to some embodiments.

According to some embodiments, as shown in FIG. 2, a training system 220 uses annotations, that are added to the Java model 215 in advance, to identify relationships between objects that should be used to generate training text. The training system 220 uses introspection, at runtime, to determine the values and properties of the objects. Using this combination of annotations and introspection, the training system 220 generates instances of training text that are specific to the configuration of the storage system. In some embodiments, each instance of training text 330 describes a particular relationship within the configuration model. Example instances of training text 330 are shown in FIG. 3. Once generated in this manner, the training text 330 that is generated is provided to a Large Language Model (LLM)

225 and used to train a large language model 225 to learn the configuration of the storage system. The LLM 225 is then used by a natural language interactive voice response system 230 to enable the Interactive Voice Response (IVR) system 230 to receive natural language queries related to the storage system configuration, and to enable the IVR system 230 to generate natural language responses to the natural language queries.

FIG. 3 is a block diagram showing an example process of generating training text from the storage system configuration models of FIG. 2, and using the training text to train a large language model 225 for use by an interactive voice response system 230 to provide a natural language interface to the storage system management application 210, according to some embodiments.

As shown in FIG. 3, in some embodiments the storage system management application 210 generates a Java model 215 from the C-structures 205 maintained by the storage system configurator 200. The Java model 215 is annotated, such that objects which are of importance to the storage system configuration are annotated using an annotation specific to the training system 220.

The training system 220, in some embodiments, is configured to generate text from the Java model 215 that describes every aspect of the storage system configuration. For example, in some embodiments the training system 220 includes a text generation system 300 that includes an object retrieval system 305. The object retrieval system 305 identifies objects of the Java model 215 and traverses the Java model 215 identifying relationships between objects by reading the annotations 310. Java Introspection 315 is used to determine the properties of the objects, and an object parsing system 320 determines the values of the objects. When a relationship is determined between a first object and a second object, the text generation system generates text describing the relationship between the first and second object. When introspection determines a value of an object, the text generation system generates text describing the relationship between the object and its value. When an object is parsed, the text generation system 300 generates text describing the determined properties of the objects.

FIG. 3 shows several examples of text that may be generated. For example, assume that the top-level object of the Java model 215 contains the identity of the storage system as Storage System #004054215. A relationship is determined within the Java model 215 between the identity of the storage system and the virtual witness in use on the storage system. Introspection is used to determine the value of the virtual witness=virtual witness vWit10. Accordingly, the text generator 300 generates the following text: "Storage System #004054215 has Virtual Witness vWit10." This instance of text describes the singular relationship within the Java model 215. The text generation system then determines that there is a relationship within the Java model 215 between Virtual Witness vWit10 and the port used by that virtual witness. Accordingly, the text generation system generates the following text: "Virtual Witness vWit10 has Port Number 101123". Virtual witness vWit10 also has a Unique ID (UID) uid=101123. Accordingly, the text generation system generates the following text "Virtual witness vWit10 has uid 101123".

Each relationship between two objects or between an object and a corresponding parameter of the object, is thus used by the text generator 300 to generate a single instance of training text. Each instance of training text describes a particular relationship between the two objects and may include one or more values for the objects determined using Java introspection. The annotations are used to identify objects or relationships of consequence and are used by the text generation system to determine which objects and relationships should be used to generate instances of training text. This causes the text generation system to generate text that is relevant to the storage system configuration and allows the Java model to specify, in advance, aspects of the storage system configuration that should be used to create instances of training text, and hence used to train the large language model 225.

Figure 4:
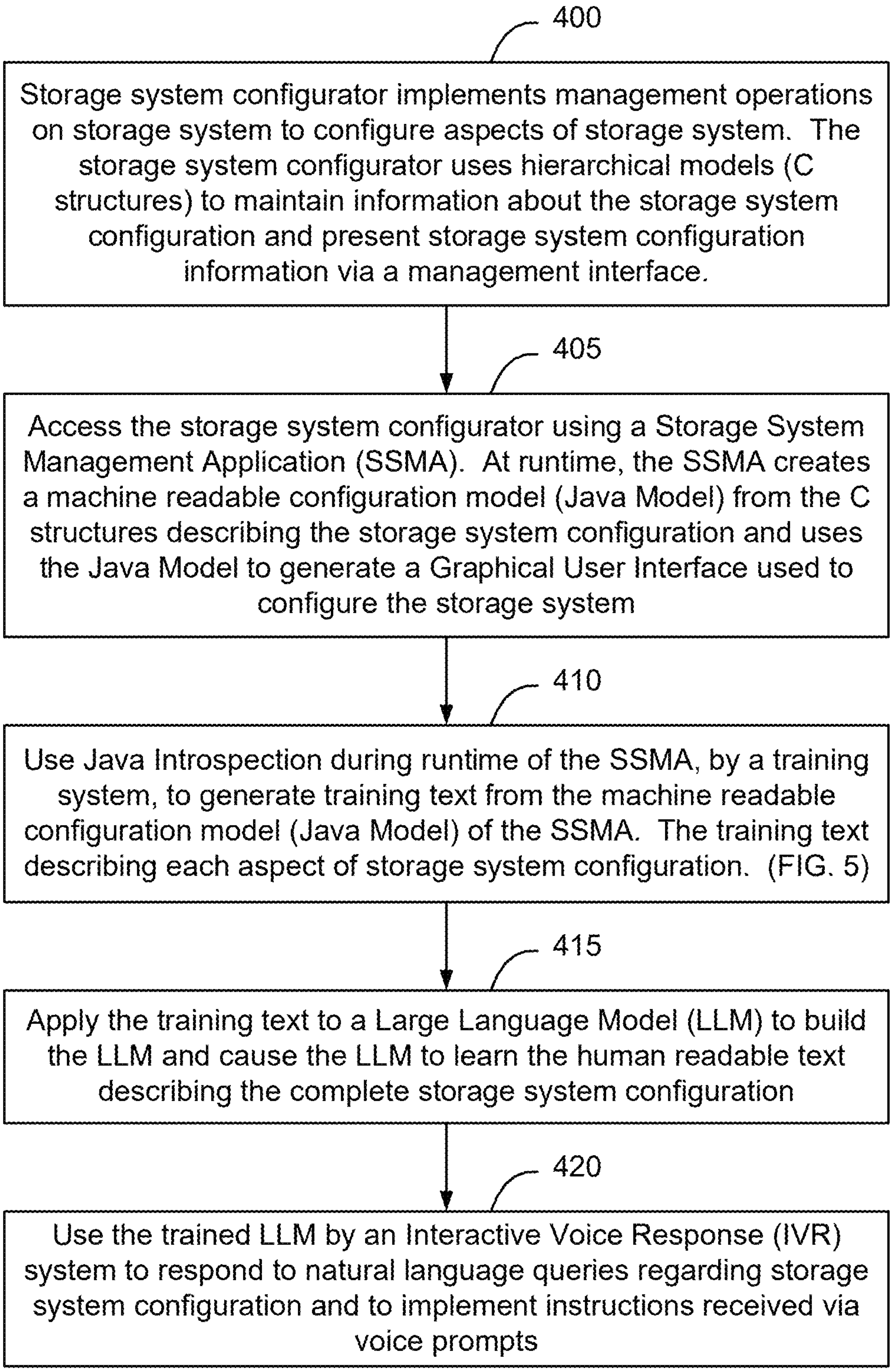
FIG. 4 is a flow chart of an example process of training a large language model to learn a storage system configuration to enable an interactive voice response system to be used to access a storage system management application, according to some embodiments.

FIG. 4 is a flow chart of an example process of training a large language model 225 to learn a storage system configuration to enable an interactive voice response system 230 to be used to access a storage system management application 210, according to some embodiments. As shown in FIG. 4, in some embodiments during operation, the storage system configurator implements various management actions to configure operation of a storage system (block 400) to configure various aspects of the storage system. Hence, the configuration of a given storage system will depend on the particular selection of operations that have been implemented by the storage system configurator 200 on the storage system over time. As management operations are implemented on the storage system 100 by the storage system configurator 200, the storage system configurator 200 uses machine-readable hierarchical models (e.g., C-structures 205) to maintain information about the storage system configuration and present storage system configuration information to a management interface 155 of the storage system.

The storage system configurator 200 is then accessed using a storage system management application 210 (block 405). The storage system management application 210 populates a configuration model (Java model 215) from the C-structures describing the storage system maintained by the storage system configurator 200. The Java model 215 is annotated with annotations describing relationships between objects of the Java model 215 that are relevant to the overall configuration of the storage system 100 and are required to be captured to describe the storage system configuration to train the large language model 225.

The training system 220 uses Java introspection to generate training text from the Java model 215 (block 410). The training text describes each aspect of the storage system configuration. Additional details describing a process of creating training text from the Java model 215 using Java annotations and Java introspection is described in greater detail in connection with FIG. 5.

The training text is supplied to a large language model 225 and used to train the large language model 225 to learn the configuration of the storage system (block 415). Specifically, since the training text describes the particular configuration of the storage system that is being managed by the storage system management application, and the configuration of the storage system was described to the large language model using text that is written as natural language, the large language model 225 is able to learn the natural language description of the storage system configuration. This enables the trained large language model 225 to be used by an interactive voice response system 230 to respond to natural language queries regarding about aspects of configuration of the storage system, and to implement configuration instructions received through the voice prompts (block 420) to thereby enable the user to implement configuration changes using voice commands provided to the storage system management application.

For example, a user may ask the storage system management application 210 about a particular aspect of storage system configuration using a natural language question. In response, the interactive voice response system 230, using the trained large language model 225, parses the text of the natural language question to determine the context of the question and determine, from the large language model 225, responsive information related to the question. The interactive voice response system then generates an audible response to the question asked by the user. Likewise, a user can instruct the storage system management application 210 to transition to a different portion of the graphical user interface 235 configured to display particular storage system configuration information, or can instruct the storage system management application 210 to make a modification to the storage system configuration. For example, the user may verbally instruct the storage system management application 210 to transition to a screen of the GUI 235 that is configured to show the virtual witnesses that are in place for a given storage system, or may instruct the storage system management application 210 to replace a current virtual witness with a different virtual witness on the storage system. There are many configuration queries and instructions that may be provided by a user using the interactive voice response system 230, and these are merely intended to be several examples.

Figure 5:
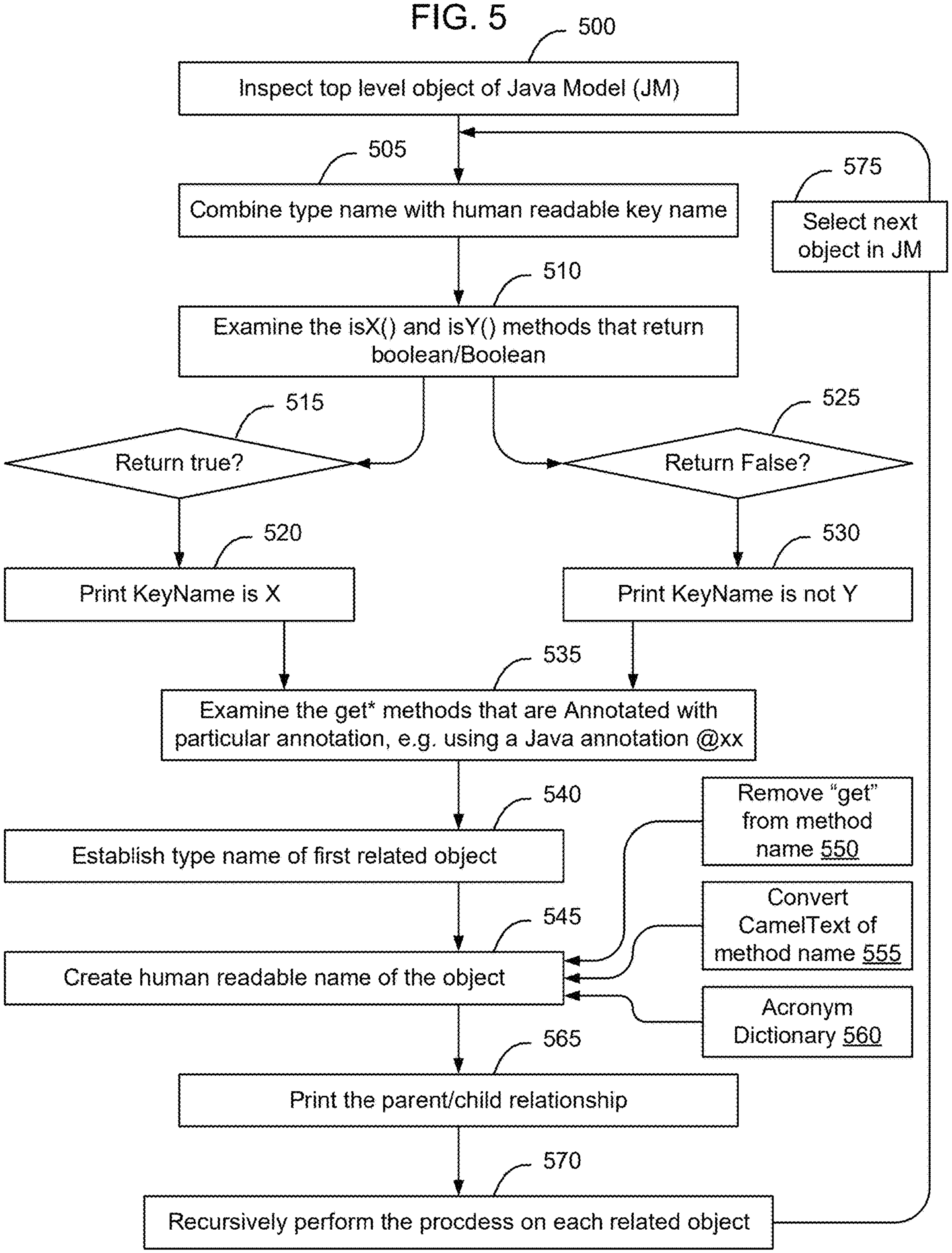
FIG. 5 is a flow chart of an example process of creating a textual representation of a Java Model (JM) that is used by a storage system management application to maintain information about the configuration of a storage system, according to some embodiments.

FIG. 5 is a flow chart of an example process of creating a textual representation of a Java Model (JM) 215 that is used by a storage system management application 210 to maintain information about the configuration of a storage system, according to some embodiments. In some embodiments, as shown in FIG. 5, the training system 220 inspects the top-level object of the Java model 215 (block 500). The text generation system combines the type name of the top-level object with a human readable key name (block 505). The text generation system then examines the "isX( )" and "isY( )" methods that return boolean/Boolean (block 510). In Java, "boolean" with a lower-case "b" is a primitive type that is either true or false. "Boolean", with a capital "B", is an object/reference type that wraps a boolean. Hence, a Boolean can be true, false, or null. If the "isX( )" or "is Y( )" method returns true (block 515), the text generator prints "Key Name (determined in block 505) is X." If the "isX( )" or "isY( )" method returns false (block 525), the text generator prints "Key Name (determined in block 505) is not Y."

The text generation system next examines the "get*" methods of the selected object that are annotated with the particular annotation, e.g. using the Java annotation @xx (block 535). Annotating the "get*" methods indicates that there is a relationship between the selected object (key name) and the related object referenced by the "get*" method. The text generation system establishes the type name of the first related object (block 540) and retrieves the human readable name of the object (block 545). The human readable name of the first related object may be determined by removing the "get" portion of the "get*" method (block 550), and converting the camel text of the name of the "get*" method (e.g., the method name that replaces the "*" in the selected "get*" method) to normal text (block 555). For example, if the "get*" method of a selected object has a method name of "getVirtualWitness", removing "get" and converting the camel text of the method name resolves to "virtual witness".

In some embodiments, an acronym dictionary may also be used to determine the human readable name, for example if the "get*" method name includes an acronym (block 560). For example, if the "get*" method has a method name of "getWLP", the human readable name of the object may be created by removing "get", and performing a lookup for "WLP" in an acronym dictionary to thereby convert the method name "getWLP" to "work load planner". The text generator then prints the parent child relationship, i.e. Key Name of selected object has relationship with human readable name of child object (block 565). In instances where the value of one of the objects is required to be inserted into the human readable text, introspection is used by the text generator to determine the value of the object, e.g. "Parent object has child object," "child object is XXX". The text generator recursively performs this process for each child object identified as being related to the parent object by the annotations (block 570). The object then returns to select and process a subsequent object of the Java model 215 (JM) (block 575).

The text generator 300 thus traverses the Java model 215 created by the storage system management application 210 at runtime from the C-structures of the managed storage system, to explore each relationship between a given parent node and each child node of the Java model 215, and generates a respective textual statement describing each such relationship. The text generator also uses introspection to generate a textual statement describing each value of each object thus enabling textual statements to be created describing each aspect of the configuration of the storage system, as reflected in the Java model 215 created by the executing instance of the storage system management application 210. After generating the training text, the training text is applied to the large language model 225 in FIG. 4, block 415, to train the LLM 225 to learn the configuration of the storage system. Once trained, the trained LLM 225 can be used by an interactive voice response system 230 of the storage system management application 210 to enable the storage system management application 210 to provide audible responses to verbal queries regarding the configuration of the storage system (block 420). The storage system management application 210, in some embodiments, also is configured to enable voice prompts to be used to navigate between sections of the storage system management application graphical user interface 235, and to receive and implement verbal commands describing intended changes to the storage system configuration.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of providing an interactive voice response interface to a storage system management application, comprising:

creating a textual representation of a machine-readable model describing a configuration of a storage system managed by the storage system management application, the textual representation including a plurality of textual statements in which each textual statement describes a relationship between a pair of objects of the machine-readable model or describes a relationship between a given object and a respective value of the given object;

providing the textual representation of the configuration of the storage system to a large language model as training data for the large language model, to train the large language model to learn the textual representation of the configuration of the storage system; and using the large language model by an interactive voice response system of the storage system management application to respond to natural language queries about the configuration of the storage system;

wherein the machine-readable model is a hierarchical Java model containing the objects describing the configuration of the storage system, the hierarchical Java model describing relationships between the objects;

wherein creating the textual representation of the machine-readable model comprises traversing the hierarchical Java model to identify each object of the Java model, and for each identified object:

determining a type name of the identified object;

determining a relationship between the identified object and another object; and generating one of the textual statements describing the determined relationship between the identified object and the another object; and wherein determining the relationship between the identified object and the another object is implemented by annotating the another object using a Java annotation in the hierarchical Java model, the Java annotation specifying that the one of the textual statements should be created describing the determined relationship between the identified object and the another object.

2. The method of claim 1, wherein determining the relationship between the identified object and the another object is implemented by examining get* methods of the identified object that are annotated using the Java annotation.

3. The method of claim 2, wherein a * portion of the get* method includes an object name written in CamelText, the method further comprising generating a human readable name of the another object by removing the word "get" from the get* method and converting the object name written in CamelText to human readable text.

4. The method of claim 2, wherein a * portion of the get* method includes an object name written as an acronym, the method further comprising performing a lookup in an acronym dictionary to generate a human readable name of the another object.

5. The method of claim 1, wherein creating the textual representation of the machine-readable model further comprises, for each identified object:

using Java introspection to generate a runtime value of the identified object; and generating one of the textual statements describing the determined relationship between the identified object and the object value.

6. The method of claim 1, wherein creating the textual representation of the machine-readable model further comprises, for each identified object:

examining isX ( ) and isY ( ) methods of the identified object that return boolean or Boolean; and generating one of the textual statements describing the determined relationship between the identified object and the result of the isX ( ) and isY ( ) methods.

7. The method of claim 1, further comprising using interactive voice response system to receive natural language instructions regarding storage system configuration changes, and using the large language model to parse the instructions regarding the storage system configuration changes.

8. A system for providing an interactive voice response interface to a storage system management application, comprising:

one or more processors and one or more storage devices storing instructions that are configured, when executed by the one or more processors, to cause the one or more processors to perform operations comprising:

creating a textual representation of a machine-readable model describing a configuration of a storage system managed by the storage system management application, the textual representation including a plurality of textual statements in which each textual statement describes a respective relationship between a pair of objects of the machine-readable model or describes a relationship between a given object and a respective value of the given object;

providing the textual representation of the configuration of the storage system to a large language model as training data for the large language model, to train the large language model to learn the textual representation of the configuration of the storage system; and using the large language model, by an interactive voice response system of the storage system management application, to respond to natural language queries about the configuration of the storage system from the learned textual representation of the configuration of the storage system;

wherein the machine-readable model is a hierarchical Java model containing the objects describing the configuration of the storage system, the hierarchical Java model describing relationships between the objects;

wherein creating the textual representation of the machine-readable model comprises traversing the hierarchical Java model to identify each object of the Java model, and for each identified object:

determining a type name of the identified object;

determining a relationship between the identified object and another object; and generating one of the textual statements describing the determined relationship between the identified object and the another object; and wherein determining the relationship between the identified object and the another object is implemented by annotating the another object using a Java annotation in the hierarchical Java model, the Java annotation specifying that the one of the textual statements should be created describing the determined relationship between the identified object and the another object.

9. The system of claim 8, wherein determining the relationship between the identified object and the another object is implemented by examining get* methods of the identified object that are annotated using the Java annotation.

10. The system of claim 9, wherein a * portion of the get* method includes an object name written in CamelText, the method further comprising generating a human readable name of the another object by removing the word "get" from the get* method and converting the object name written in CamelText to human readable text.

11. The system of claim 9, wherein a * portion of the get* method includes an object name written as an acronym, the method further comprising performing a lookup in an acronym dictionary to generate a human readable name of the another object.

12. The system of claim 8, wherein creating the textual representation of the machine-readable model further comprises, for each identified object:

using Java introspection to generate a value of the identified object; and generating one of the textual statements describing the determined relationship between the identified object and the object value.

13. The system of claim 8, wherein creating the textual representation of a machine-readable model further comprises, for each identified object:

examining isX ( ) and isY ( ) methods of the identified object that return boolean or Boolean; and generating one of the textual statements describing the determined relationship between the identified object and the result of the isX ( ) and isY ( ) methods.

14. The system of claim 8, further comprising using interactive voice response system to receive natural language instructions regarding storage system configuration changes, and using the large language model to parse the instructions regarding the storage system configuration changes.

* * * * *